United States Patent
Ye et al.

(10) Patent No.: US 11,861,538 B1
(45) Date of Patent: Jan. 2, 2024

(54) OPTIMIZATION TECHNIQUES FOR CONTENT PRESENTATION STRATEGIES

(71) Applicant: Amazon Technologies, Inc., Seattle, WA (US)

(72) Inventors: Patrick Ye, Seattle, WA (US); Jim C Huang, Seattle, WA (US); Xuan Wu, Bothell, WA (US); Noor-E-Gagan Singh, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 17/030,135

(22) Filed: Sep. 23, 2020

(51) Int. Cl.
*G06Q 10/0637* (2023.01)
*G06Q 10/04* (2023.01)
*G06Q 10/0639* (2023.01)
*G06Q 30/0251* (2023.01)
*G06Q 30/0204* (2023.01)

(52) U.S. Cl.
CPC ........ *G06Q 10/0637* (2013.01); *G06Q 10/04* (2013.01); *G06Q 10/0639* (2013.01); *G06Q 30/0205* (2013.01); *G06Q 30/0269* (2013.01)

(58) Field of Classification Search
CPC . G06Q 10/04; G06Q 30/0205; G06Q 10/0637
See application file for complete search history.

(56) References Cited

U.S. PATENT DOCUMENTS

| | | | |
|---|---|---|---|
| 8,285,581 B2 | 10/2012 | Abe et al. | |
| 10,133,812 B2 | 11/2018 | Lee et al. | |
| 10,225,365 B1 * | 3/2019 | Hotchkies | H04L 67/63 |
| 10,242,381 B1 | 3/2019 | Zappella et al. | |
| 10,311,371 B1 * | 6/2019 | Hotchkies | G06K 9/6267 |
| 10,311,372 B1 * | 6/2019 | Hotchkies | H04L 67/1097 |
| 10,497,012 B1 | 12/2019 | Majumder et al. | |
| 11,049,133 B1 * | 6/2021 | Huang | G06Q 30/0249 |
| 2018/0158093 A1 * | 6/2018 | Szirtes | G06F 16/489 |
| 2018/0260736 A1 * | 9/2018 | Yates | H04L 67/535 |

(Continued)

FOREIGN PATENT DOCUMENTS

WO  WO-2021028463 A1 *  2/2021  .......... G06N 3/0445

OTHER PUBLICATIONS

Theodoros Evgeniou, et al., "Regularized Mult-Task Learning", ACM, KDD '04, Aug. 22-25, 2004, pp. 1-9.

(Continued)

*Primary Examiner* — Deirdre D Hatcher
(74) *Attorney, Agent, or Firm* — Robert C. Kowert; Kowert, Hood, Munyon, Rankin & Goetzel, P.C.

(57) ABSTRACT

Strategies for an objective associated with an offering set are obtained. A strategy assigns respective selection probabilities of receiving content associated with the offering set to users of a user population. Strategy optimization iterations are performed with respect to a sub-sample of the population and a subset of the strategies. In a given iteration, weights assigned to the strategies are used to determine aggregated selection probabilities for users, content pertaining to the offering set is presented to users selected based on the aggregated probabilities, and the weights are adjusted based on feedback metrics and an exploration-exploitation tradeoff parameter. Based on weights updated in the iterations, content associated with the offering set is presented to users which were not in the sub-sample.

20 Claims, 10 Drawing Sheets

(56) References Cited

U.S. PATENT DOCUMENTS

| | | | |
|---|---|---|---|
| 2021/0182351 A1* | 6/2021 | Shen | G06N 20/00 |
| 2021/0233147 A1* | 7/2021 | Berl | G06Q 30/0631 |
| 2021/0357745 A1* | 11/2021 | Wallis | G06N 3/0454 |

OTHER PUBLICATIONS

Alina Beygelzimer, et al., "Contextual Bandit Algorithms with Supervised Learning Guarantees", Retrieved from arXiv:1002.4058v3, Oct. 27, 2011, pp. 1-10.

Sebastien Bubeck, et al., "Regret Analysis of Stochastic and Nonstochastic Multi-armed Bandit Problems", Retrieved from arXiv:1204.5721v2, Nov. 3, 2012, pp. 1-130.

Leon Bottou, et al., "Counterfactual Reasoning and Learning Systems: The Example of Computational Advertising", Journal of Machine Learning Research 14, 2013, pp. 3207-3260.

Andrew G. Barto, et al., "Recent Advances in Hierarchical Reinforcement Learning", Discrete Event Dynamic Systems: Theory and Applications, 2003, pp. 41-77.

Thomas Jaksch, et al., "Near-optimal Regret Bounds for Reinforcement Learning", Journal of Machine Learning Research 11, 2010, pp. 1563-1600.

* cited by examiner

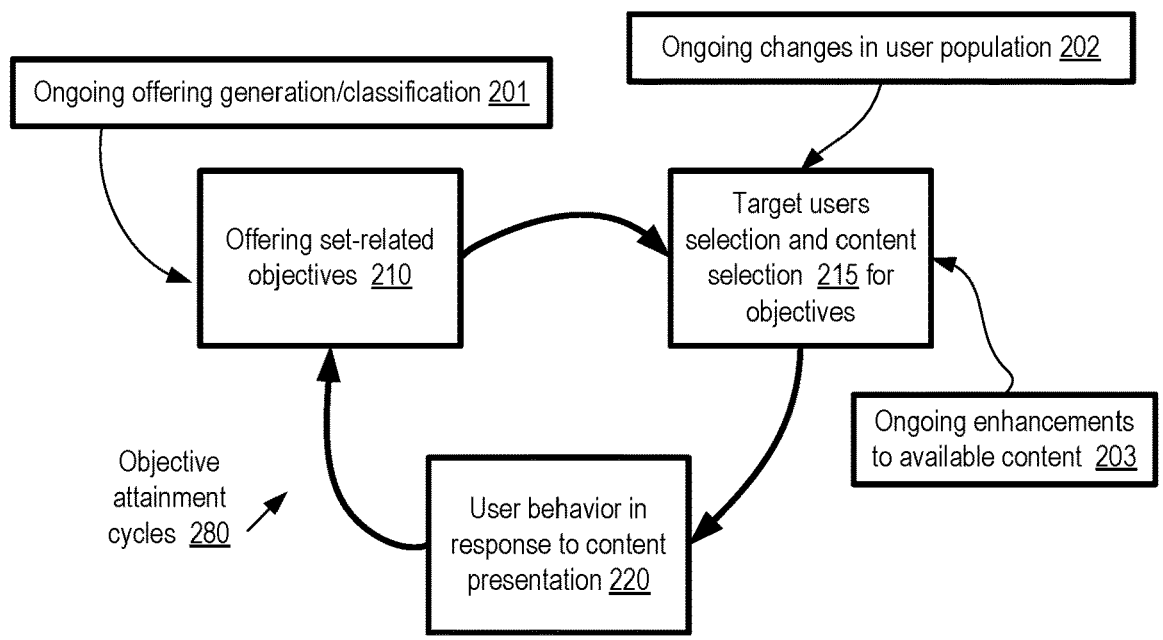
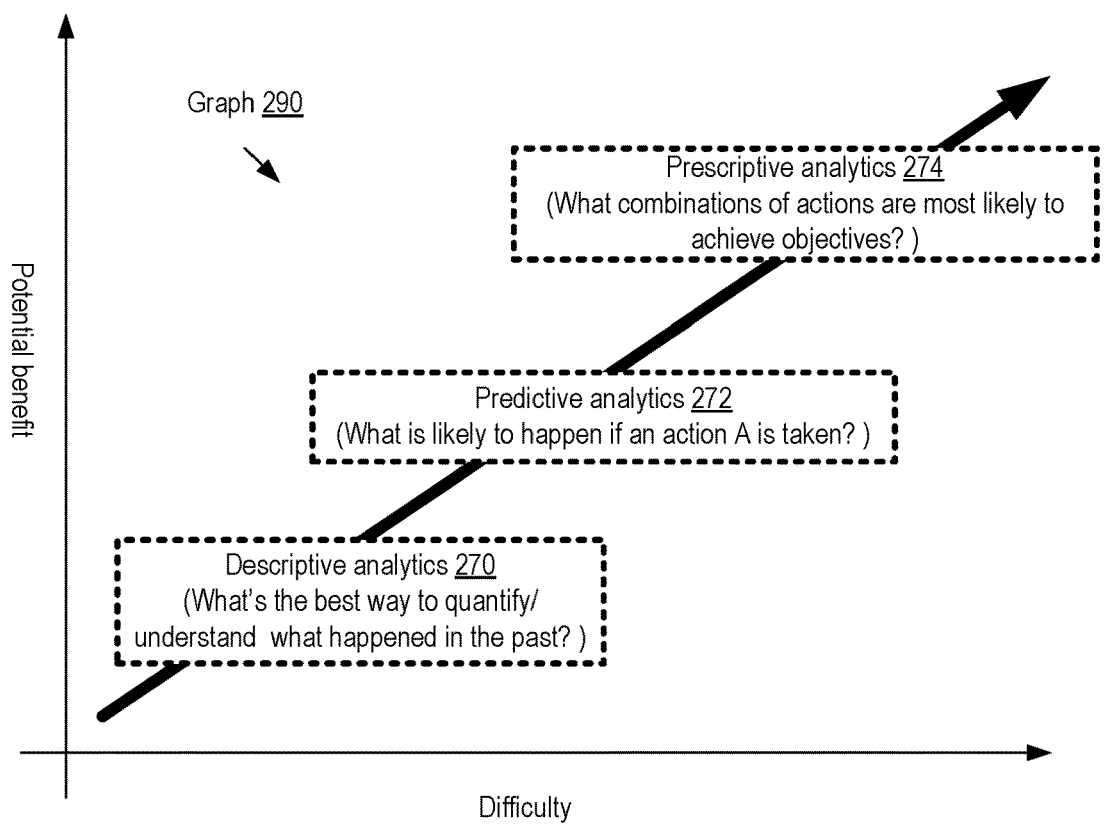
FIG. 2 https://<website>/enterObjectiveInfo

Please enter your content presentation objective information below. Use the drop down menus to choose from commonly-used options; you can provide custom entries instead if desired. A machine-readable version of the objective will be provided to relevant strategy generators if you click on "InitiateOptimizations", and the best-working combination of generated strategies will be implemented. ← 777

Drop-down menu icon 778

| Objective name 703 | MyObjective Q4 2020 704 | | |
|---|---|---|---|
| Offering set 705 | Website catalog items group IG1 707 | ▼ | Required 708 |
| Desired user actions 712 | Click on link to item 714 | ▼ | Required 716 |
| User eligibility criteria 718 | All users are eligible 720 | ▼ | Optional 722 |
| Deadline/event 724 | 1 month from today 726 | ▼ | Optional 728 |
| Content channels 730 | Push notifications 732 | ▼ | Required 734 |
| Feedback metrics 736 | Clicks/second 738 | ▼ | Required 740 |
| Optimization termination criteria 742 | Deadline expiration 744 | ▼ | Optional 746 |

...

Save 766

View strategy generator info 768

InitiateOptimization 769

Web-based interface 702

FIG. 7

OPTIMIZATION TECHNIQUES FOR CONTENT PRESENTATION STRATEGIES

BACKGROUND

Many organizations conduct substantial portions of their operations over the Internet. For example, physical and virtual stores make their item catalogs accessible via web sites and enable millions of customers to search, browse and view the details of catalog items, information about special events such as promotions and so on via devices such as phones, tablet computing devices, and the like. Educational institutions provide information about classes, professors and the like via the Internet, and conduct many classes at least partly online. Many gyms have begun offering exercise sessions online, enabling their clients to learn about the different types of exercise options available by viewing videos and other types of content before deciding which ones to try.

There may often be a large and diverse set of potential customers for the offerings (e.g., retail catalog items, educational classes, exercise classes and the like) of organizations that conduct operations over the Internet and other networks. Furthermore, a wide variety of content items may be available to present the potential benefits of different offerings, such as images, videos, user reviews, third-party reviews and the like. For example, for some large organizations, there may potentially be hundreds of millions of potential customers spread over many countries, and the total number of offerings and associated content items available may also run into the hundreds of millions. Different sets of potential customers may only be interested in respective subsets of the offerings of such large organizations; presenting content about uninteresting offerings may be counterproductive.

In order to meet their objectives, such organizations have to make decisions about how best to convey information about their offerings to customers. For example, decisions regarding which subsets of a diverse customer base should be provided which types of content, the scheduling of the presentation of the content, what types of communication channels work best for different customers, and so on may have to be made.

BRIEF DESCRIPTION OF DRAWINGS

FIG. 2 illustrates factors which influence the attainment of objectives associated with organization offerings, and the tradeoffs of using different types of analytics algorithms for achieving the objectives, according to at least some embodiments.

FIG. 7 illustrates an example graphical user interface which may be used to specify content presentation objectives, according to at least some embodiments.

Figure 1:
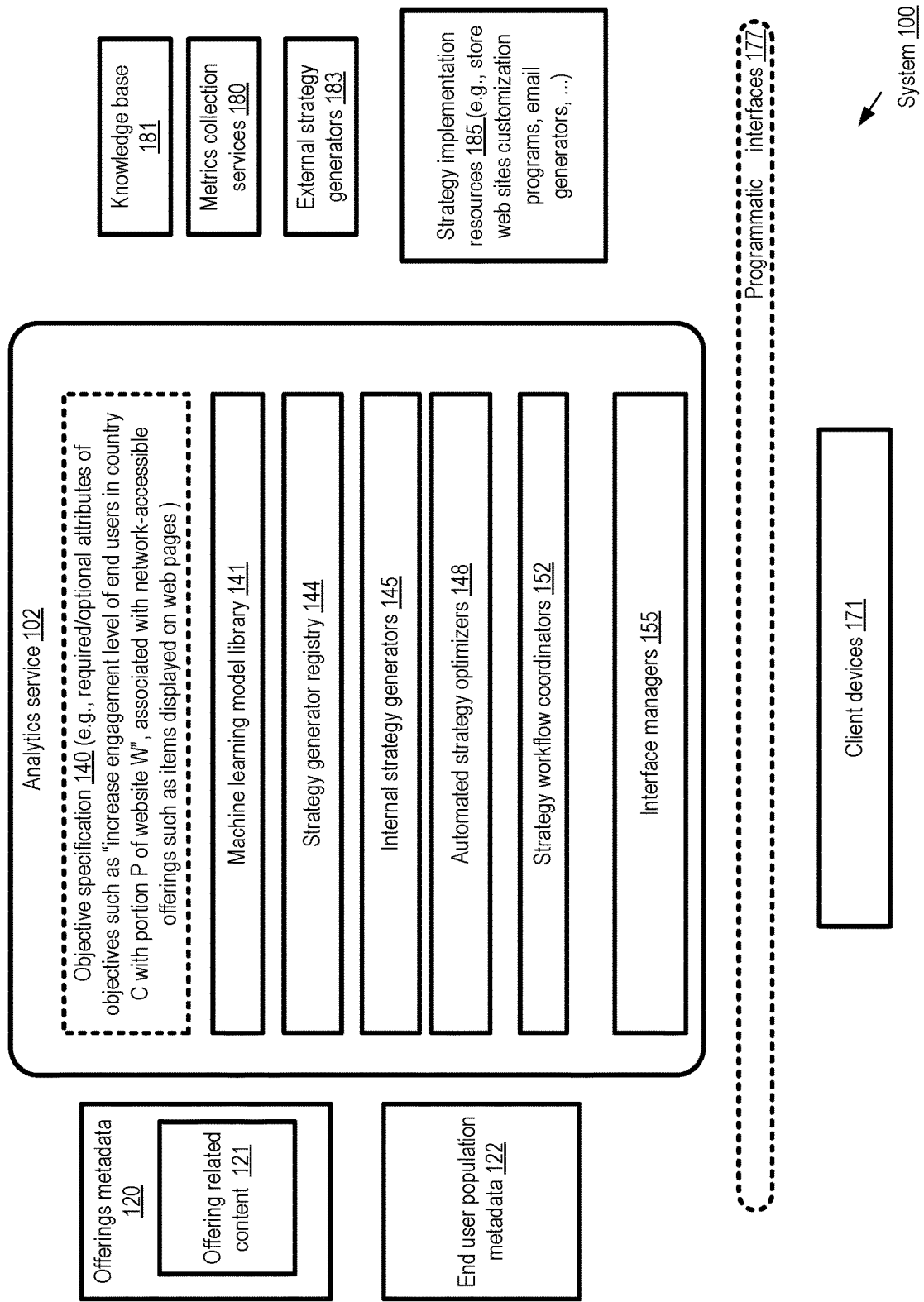
FIG. 1 illustrates an example system environment in which automated optimization of content presentation strategies may be performed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for automating the process for identifying optimal strategies (or combinations of strategies) to be used for providing content pertaining to network-accessible offerings of an organization to potential customers or consumers of the offerings. Such offerings may include, for example, items available for purchase or rental from a store web site, membership of a user group with an associated set of privileges and benefits (such as free or low-cost delivery of ordered items), subscription to a service (e.g., a service which allows a particular number of movies or television programs to be viewed per month), discounts, enrolments in classes of various kinds, and so on. The types of content which may be provided to individuals or groups selected using the optimized strategies may include, for example, images, videos, audio items, coupons in paper or electronic form, and so on. A given content presentation strategy may, for example, indicate which subset of potential or current customers of an organization should be provided particular subsets of content to achieve a concrete set of goals (referred to as an objective) of the organization. The strategy may use machine learning and other techniques to assign probabilities for targeting different customers for a given objective. Numerous strategies may be proposed for a given objective by a set of strategy generators, and optimization techniques (such as techniques based on multi-arm bandit algorithms) may be used to select the best combination of strategies (or single strategy) to be used. By using the disclosed optimization methodology, different subsets of the customer population may be provided the types of content most likely to be of interest to them and most likely to result in customer actions desired by the organizations providing the offerings, while reducing the overall consumption of computing and communication resources associated with the presentation of the content.

As one skilled in the art will appreciate in light of this disclosure, certain embodiments may be capable of achieving various advantages, including some or all of the following: (a) substantially reducing the overall amount of computation, storage and networking resources required to disseminate content associated with organization offerings to achieve specified organizational goals, (b) improving the user experience of customers of the organizations, e.g., by avoiding presentation of content which is likely to be of less interest to the customers, and/or (c) providing a taxonomy for specifying objectives associated with content presentation using easy-to-use interfaces, and generating machine readable versions of such objectives in a standard format which can be consumed by a variety of strategy generators.

According to some embodiments, a system may comprise one or more computing devices. The devices may include instructions that upon execution on or across the devices cause the devices to obtain, e.g., via one or more programmatic interfaces of an analytics service of a provider network or cloud computing environment, values of a plurality of attributes of an objective associated with an offering set. The offering set may include one or more network-accessible offerings of an organization. The values of the attributes may indicate, for example, (a) one or more types of desired user actions with respect to one or more web sites of the organization, (b) one or more channels for presentation of content associated with the objective, and/or (c) one or more offering set-specific metrics associated the desired user actions. A machine-readable representation of the objective may be transmitted or provided to one or more registered strategy generators (e.g., respective sets of programs that have been registered earlier at the analytics service, which can automatically generate strategies for selecting user subsets for content presentation) in various embodiments.

Several user selection strategies may be obtained from the registered strategy generators for the objective in at least some embodiments. A given user selection strategy may assign respective selection probabilities associated with receiving at least some content associated with the offering set to individual users of a user population in various embodiments. In some embodiments, one or more of the strategy generators may use machine learning models to generate the selection probabilities.

From among the set of strategies obtained for the objective, an initial subset of candidate strategies for optimization may be identified, e.g., based at least in part on an analysis of a knowledge base such as a repository of records associated with one or more other objectives associated with respective offering sets. In some embodiments, the machine readable, standardized representations of the objectives may simplify the task of identifying similar objectives stored in the repository. Strategies that are similar to successfully-employed past strategies for an objective similar to the current objective may be included as the initial subset of candidate strategies.

A number of strategy optimization iterations may be conducted on at least a sub-sample of a user population of the organization, using the initial subset of candidate strategies to begin with, until an optimization termination criterion is met in various embodiments. A given optimization iteration may comprise several steps. One such step may involve computing respective aggregated selection probabilities for individual users of the sub-sample based at least in part on (a) per-strategy selection probabilities for the individual users, obtained from the candidate strategies and (b) respective non-negative weights assigned to individual candidate strategies. Another step may involve initiating, based at least in art on the aggregated selection probabilities, presentation of at least some content associated with the offering set to at least some users of the sub-sample via a channel indicated in the objective in some embodiments. An optimization iteration may also include collecting one or more feedback metrics over a selected time interval, including at least one offering set-specific metric indicated in the objective, and updating at least some weights assigned to the candidate strategies based at least in part on (a) analysis of the feedback metrics and (b) an exploration-exploitation tradeoff parameter. In some embodiments, the iterative optimization technique used may represent an implementation of a variant of a contextual bandit learning technique with expert advice.

After the iterations are terminated, in at least some embodiments, weights which were updated for the candidate strategies (e.g., in the final iteration) may be used to present content associated with the offering to at least some members of the user population which are not in the sub-sample. That is, the content may be presented to a larger subset of the population using those strategies which has been found to be more successful than others being evaluated during the optimization iterations. Furthermore, results of the optimization, e.g., records indicating the current objective and the set of strategies which were found to be successful for it, may be added to the knowledge base or repository, thereby adding to the information which can be used to select good starting candidate strategies for the optimization procedure in the future.

In at least some embodiments, in addition to using the respective weights of the candidate user selection strategies being considered in an optimization iterations to identify users to whom the content pertaining to the offering set is provided, a group of hold-out users may also be selected, to whom the content is not provided. The hold-out group may act as a control group; similar metrics may be collected from the hold-out group as are collected from the users to whom the content is provided, and these metrics may also be analyzed to determine how to update the weights assigned to the candidate strategies. Some of the candidate strategies may be based on heuristics rather than on machine learning models in various embodiments. According to at least one embodiment, the iterative optimization process may be performed in response to one or more requests received via programmatic interfaces of the analytics service.

In some embodiments, the machine readable version of an objective O1 associated with a set of offerings may be transformed into an embedding vector EV1, e.g., using machine learning techniques. Similarity scores between EV1 and a set of earlier-constructed embedding vectors EV2, EV3, EV4, . . . for other objectives O2, O3, O4, . . . for which optimal combinations of strategies have been found may be obtained. The initial set of candidate user selection strategies may then be selected with the help of the similarity scores—e.g., strategies which were successfully employed for some number of the most-similar objectives to O1 may be chosen as members of the initial set. In at least one embodiment, an easy-to-use interface may be provided to enable clients of the analytics service to specify attributes of objectives which comply with a standard taxonomy for objectives defined by the analytics service. Such an interface may, for example, provide the equivalent of an easy-to-fill questionnaire, or drop-down menu interface elements enabling clients to choose attribute values from a list, pre-filled default values for some objective attributes, and so on. In at least one embodiment, a list of objective attributes for which values are required (as opposed to other attributes which may be optional) for the initiation of automated strategy optimization iterations may be provided to clients via programmatic interfaces. According to some embodiments, a client of the analytics service may provide, using programmatic interfaces, an indication of one or more parameters or hyper-parameters of the optimization iterations such as one or more of: (a) the exploration-exploitation tradeoff parameter, (b) a sampling parameter to be used to select the sub-sample of the user population for an iteration, (c) the termination criterion for the optimization iterations, or (d) a time period during which the feedback metrics are to be collected in an optimization iteration.

Objectives such as O1 may include additional attributes in some embodiments, such as deadlines, eligibility criteria for identifying users to whom content should be provided, publicly-advertised events associated with the offering (e.g., a special holiday sale), geographical regions within which users are to be identified, indications of portions of a web site with respect to which the user actions are desired, and so on. Desired user actions may include, among others, clicks on one or more web pages or web links, electronic purchases of items available from store catalogs, joining a user group, changing a state of a user-specific item list associated with a store catalog (e.g., moving an item from a "wish list" to a "shopping cart"), and so on.

In some embodiments, the feedback metrics considered when deciding how (Or if) to change weights associated with the strategies may include a measure of the efficiency of the presentation of content—e.g., resource usage metrics associated with the provision of the content to the users during the iteration may also be taken into account. In at least one embodiment, a respective context vector based at least in part on a representation of a particular user's state with respect to an individual iteration may be computed, e.g., based on data collected on the user's actions. The user state (and hence the context vector) may change from iteration to iteration, and the aggregate selection probability for a given user may be computed based at least in part on the current iteration's context vector for that user. In at least some embodiments in which the offerings are associated with items of a store inventory accessible via one or more web sites, a first set of metrics about user interactions with the web sites over a long duration (e.g., one or more months or years) prior to the initiation of the strategy optimization iterations may be collected to generate a baseline set of user context information. Such metrics may include, for example, the number of interaction sessions of a given user with the web site during the time interval, the number of distinct items viewed, the number of web site pages views, the number of searches conducted by the user, and so on. Shorter-term metrics may then be collected iteratively (e.g., every H hours or every D days while the optimization iterations are conducted), and the shorter-term metrics may be aggregated with the baseline user context information. As a result of such aggregation, in at least some embodiments the user context information used to modify weights assigned to strategies may take user events/actions which occurred prior to the initiation of the optimization iterations, and may not rely entirely on user events/actions which are responsive to the presentation of the content during the optimization iterations. User-specific reward values may be computed based on users' actions in some embodiments and analyzed as part of the feedback metrics.

According to at least one embodiment, an analytics service may enable programmatic registration of strategy generators from which the candidate user selection strategies are obtained for the optimization iterations. Using programmatic interfaces of the analytics service, metadata (such as network addresses to which machine readable representations of the objectives can be transmitted) about automated strategy providers may be submitted in registration requests, and such metadata may be stored in a registry of strategy providers at the analytics service. When a new objective is obtained, notifications of the objective may be provided to some or all of the registered strategy generators, so that candidate strategies can be prepared for evaluation/optimization. In effect, the analytics service may serve as an impartial judge of the strategies generated by different registered strategy generators in such embodiments.

In at least some embodiments, logic similar to that indicated in the following example pseudo-code (EPC) for contextual bandits with expert advice may be employed for content strategy optimization iterations. Note that in the example pseudo-code, the number of iterations to be performed (T) is assumed to be known in advance; that is, the optimization termination criterion is simply the completion of T iterations. In various implementations, other types of termination criteria may be used as indicated above; as such, the logic of the algorithm may be modified somewhat based on whether T is known in advance or not. Further, in the example pseudo-code, the problem of selecting the specific content to be presented is not addressed and only the selection of users for presentation of some assumed known content is addressed. In at least some implementations, the selection of content may also be addressed probabilistically in the strategies.

- - - Start Example Pseudo-Code EPC for Optimization Algorithm - - -

1: Input:
2: User sets $U_i, \ldots, U_k$ with respective selection probabilities $p_{k,u}$ for each member u, \\ provided by K strategy generators $1, \ldots, K$, each providing one strategy;
3: T: the number of iterations to be conducted;
4: Initial non-negative weights $(w_i(1), \ldots, w_k(1))$ assigned to K strategy generators
5: $\delta$: Exploration-exploitation parameter
6: optimize( ){
7: $p_{MIN}$=sqrt((log K)/(2*7))
8: for t in (1 . . . 7) do
9: for each user u in $U_i, \ldots, U_k$ do
10: get per-strategy selection probabilities $p_{k,u}$
11: $W_t = \Sigma_k w_k(t)$
12: # compute aggregated selection probability for user u
13: $p(u)=(1-2 p_{MIN})\Sigma_k((w_k(t)p_{k,u})/W_t)+p_{MIN}$
14: determine whether content is to be presented to user u based on p(u) and \\ present content if u is selected
15: compute user-specific reward function r(u) based on feedback from u
16: set adjusted reward r'(u)=r(u)/p(u)
17: end for
18: // modify weights based on feedback and exploration-exploitation parameter
19: for k in $(1, \ldots, K)$ do 20: // compute intermediary terms $y_k$ (based on feedback) and $v_k$
21: $y_k = \Sigma_{(u\ in\ U/k)} p_{k,u}\ r'(u)$
22: $v_k = \Sigma_{(u\ in\ U/k)} (p_{k,u}/p(u) + (1-p_{k,u})/(1-p(u))$
23: $w_k(t+1)\ \alpha\ w_k(t)\exp((p_{MIN}/2)(y_k + y_k(\sqrt{\log(K/\delta)/2T})))$
24: end for
25: end for
26: } // end optimize( )

- - - End EPC - - -

In lines 2-5 of the example pseudo-code EPC, the inputs to the optimize( ) function used for the optimization iterations are indicated: respective groups of users for whom strategies are provided by K strategy generators, the number of iterations to be conducted, the initial weights assigned to the strategies, and the exploration-exploitation parameter. Each optimization iteration is associated with a respective value of t in the for loop starting in line 8. Aggregated selection probabilities for individual users are generated in line 13, based on the current weights and the per-strategy selection probabilities. User-specific reward functions are computed based on the feedback received from individual users, as indicated in lines 15 and 16. The weights for the different strategies are adjusted based at least in part on the feedback/rewards and on the exploration-exploitation parameter in lines 21-23.

According to some embodiments, as suggested earlier, an optimization methodology of the kind introduced above may be implemented at a network-accessible analytics service of a provider network, e.g., in response to one or more programmatic requests directed to the analytics service by its clients. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which automated optimization of content presentation strategies may be performed, according to at least some embodiments. As shown, system 100 comprises resources and artifacts of an analytics service 102, including a machine learning model library 141, a strategy generator registry 144, a set of internal strategy generators 145, one or more automated strategy optimizers 148, one or more strategy workflow coordinators 152 and a set of interface managers 155. The analytics service 102 may define and/or publish an objective specification 140 in the depicted embodiment, which indicates required and optional attributes of objectives for network-accessible offerings (such as items displayed on web pages) available from one or more organizations. A given objective may, for example, comprise the logical equivalent of "increase the engagement level of end users in country C with portion P of website W". In some embodiments, one or more of the offerings may be accessed by users without using a network—e.g., some offerings may be obtained by a user visiting a brick-and-mortar store or office.

Offerings metadata 120 may include various types of information about the offerings for which the objectives are defined (such as the names of various items of a web-accessible catalog, item categories, descriptions, sizes, weights, etc.) Offering related content 121 may include images, videos, and/or audio in addition to text descriptions of the offerings, coupons, and the like in at least some embodiments. The analytics service 102 may also have access to end user population metadata 122 in the depicted embodiment, comprising user names/identifiers, demographic information which the users have agreed to provide via opt-in interfaces, records of user interactions and transactions with respect to offerings, and so on. Such user metadata may be used to generate context vectors representing individual users, which are then utilized in the computations of strategy optimization iterations.

Knowledge base 181 may store records of earlier optimization efforts, indicating for example how successful different types of strategies have been in the past for various types of objectives. One or more metrics collection services 180 may be employed to gather metrics of user actions and feedback to the presentation of content in the optimization iterations. A number of strategy implementation resources 185 may be employed in different embodiments to present content associated with offering sets to users, such as store web site customization programs which can modify the content made available to different users of a store web site, email generators, and the like. In some embodiments, at least a portion of the content associated with an offering set may be presented to users in the form of advertisements, e.g., on television, radio, web sites or social media platforms, newspapers, magazines, and so on.

The analytics service 102 may implement a set of programmatic interfaces 177 in the depicted embodiment, such as one or more web-based consoles, command-line tools, graphical user interfaces, application programming interfaces (APIs) and the like. Clients of the analytics service may use the interfaces 177 to submit messages and requests pertaining to strategies to be used to achieve objectives associated with offerings, such as messages indicating objectives, requests to register external strategy generators 183, requests to initiate or terminate strategy optimization iterations and so on. Interface managers 155 may obtain the requests submitted via interfaces 177 from a variety of client devices 171 in the depicted embodiment, such as desktops, laptops, phones, tablets, and the like. The interface managers 155 may then send respective internal versions of the requests to other components of the analytics service 102, and transmit responses generated at the other components back to the clients. Interface managers 155, strategy workflow coordinators 152, internal strategy generators 145 (e.g., programs developed at the analytics service itself to produce strategies for achieving objectives), external strategy generators 183 (e.g., programs developed by third parties of analytics service clients to produce strategies for achieving objectives), metrics collection services 180 and/or strategy implementation resources may respectively utilize hardware and software of one or more computing devices in the depicted embodiment.

According to at least some embodiments, values of a plurality of attributes of an objective associated with a set of one or more offerings represented in offerings metadata 120, for which respective content items are to be presented to at least a portion of a user population represented in end user population metadata 122, may be obtained via programmatic interfaces 177. The attributes of an objective may include, for example, (a) types of desired user actions (e.g., actions users may take with respect to one or more web sites of an organization), (b) channels for presentation of content associated with the objective, and (c) offering set-specific metrics associated with the desired user actions. A machine-readable version of the objective may be provided to one or more registered strategy generators, e.g., including internal strategy generators 145 and/or external strategy generators 183. The strategy workflow coordinators 152 may, for example, receive the objective from an interface manager, generate the machine-readable version, and cause the machine-readable version to be stored at a repository from which internal and external strategy generators may access the machine-readable version in some embodiments. In other embodiments, the machine-readable version may be transmitted to an automated strategy optimizer 148, which may in turn notify one or more strategy generators about the objective. Internal strategy generators 145 may comprise one or more machine learning models of library 141, for example, that consume some combination of objective representations, end user population metadata 122, and offerings metadata 120 as input, and produce probabilistic rules for selecting users to whom content associated with an offering set indicated in the objective is to be presented. External strategy generators 183 may comprise programs run at resources external to the analytics service (e.g., programs run at client premises or at third party premises) which provide similar functionality as internal strategy generators 145. In effect, an indication of the objective may be broadcast to several registered strategy generators, in the expectation that one or more of the strategy generators will propose respective strategies on how best to achieve the objective.

For a given objective whose machine-readable representation is provided, several different user selection strategies may be obtained at an automated strategy optimizer 148 in various embodiments from the strategy generators, with the strategies differing from one another depending on the logic and/or heuristics being employed at the respective strategy generators 145 and/or 183. A given user selection strategy may assign respective selection probabilities to individual users of a user population, associated with receiving at least some content associated with the offering set of the objective. In some cases, a strategy may include a set of rules for generating the probabilities for any given user; in other cases, a strategy may simply provide the actual probabilities. In at least some embodiments, a strategy may also include rules for selecting the particular content items to be provided to users, or indicate the actual content to be provided.

In the embodiment depicted in FIG. 1, if the number of strategies received exceeds a threshold, an automated strategy optimizer 148 may identify an initial subset of candidate user selection strategies for optimization from the strategies proposed by the internal and/or external strategy generators. The selection of the initial subset may be based at least in part on an analysis of a repository of records (such as knowledge base 181) associated with other objectives associated with respective offering sets in some embodiments. If the number of strategies received is small, the automated strategy optimizer 148 may not have to select a subset of strategies; in effect, all the received strategies may be considered part of the initial subset with which the optimization iterations are started in such scenarios.

In various embodiments, the automated strategy optimizer 148 may conduct, with respect to at least a sub-sample of the user population, a number of strategy optimization iterations using at least the initial subset of candidate user selection strategies. The iterations may be conducted until an optimization termination criterion is met—e.g., until a desired level of user engagement/actions is reached, a deadline associated with the objective expires, a set of resources deployed for the optimization have been exhausted, and so on. A given iteration may comprise computing respective aggregated selection probabilities for individual users of the sub-sample based at least in part on (a) per-strategy selection probabilities for the individual users, obtained from the candidate user selection strategies and (b) respective weights assigned to the candidate user selection strategies. As such, a weighted aggregation of the probabilities assigned by the candidate strategies may be obtained for a given user. At least some content associated with the offering set may be presented to some of the users via the channel(s) indicated in the objective, e.g., with the help of strategy implementation resources 185. Feedback metrics (which may comprise offering set-specific metrics indicated in the objective) may be collected for the iteration for some time interval after the content is presented, e.g., using metrics collection services 180. Note that at least on some embodiments, the feedback metrics may include more global metrics which are not necessarily tied to the offering set itself (and are thus not offering set-specific); for example, the impact (of presenting the content) on other offerings of the organization may also be determined and used as feedback. Based at least in part on the collected feedback metrics and/or on an exploration-exploitation tradeoff parameter, the weights assigned to one or more of the candidate strategies may be modified as part of the iteration by the automated strategy optimizer in the depicted embodiment. In one embodiment, an exploration-exploitation tradeoff parameter may not be used, and the weights may be modified based on the feedback metrics alone.

After the optimization iterations are completed, the weights which were assigned to the strategies (e.g., in the final completed iteration) may be employed to expand the scope of the content presentation with respect to the objective in some embodiments. In effect, the optimization iterations may represent a preliminary experiment, carried out using a relatively small set of users, to determine a successful combination of strategies, and then the successful combination may be applied to a larger user population. As such, content associated with the offering set may be provided to at least some users which were not part of the sub-sample of users affected by the optimization iterations. In addition, in at least some embodiments, records indicating the results of the optimization iterations, along with the objective for which the iterations were conducted, may be stored in a repository of records (such as knowledge base 181) which can be helpful in selecting initial candidate strategies for subsequent optimization efforts. As more such records are accumulated, the quality of the initial selection of strategies by the automated strategy optimizers may improve in various embodiments, thereby reducing the amount of time and resources needed for optimization.

FIG. 2 illustrates factors which influence the attainment of objectives associated with organization offerings, and the tradeoffs of using different types of analytics algorithms for achieving the objectives, according to at least some embodiments. Objective attainment attempts with respect to the offerings of a given organization may be a continuous cyclical process in various embodiments. As shown, objective attainment cycles 280 may comprise obtaining offering-set related objectives 210, target users selection and content selection 215 for the objectives, capturing metrics of user behavior in response to content presentation 220. The behavior of the users may in turn impact subsequent objectives 210, leading to additional cycles. The set of offerings of the organization may change substantially over time, and the manner in which offerings are grouped into related offering sets may also change, as indicated by the ongoing offering generation/classification element 201. Furthermore, there may be ongoing changes in user population 202, as well as ongoing enhancements to the available content 203 which can be presented to the users. A large organization may conduct hundreds or even thousands of objective attainment cycles simultaneously in some embodiments, each associated with a respective distinct objective. The dynamic changes to available offerings, user population and available contents all tend to increase the complexity of the strategy selection problem, leading to the use of analytics tools such as various types of machine learning models.

Graph 290 show tradeoffs between the technical difficulty (shown increasing along the X axis) and the potential benefits (shown increasing along the Y axis) of different types of analytics tools and algorithms, including machine learning models, statistical models and the like. Descriptive analytics 270 may be used to analyze historical data collected with respect to organizational objectives to discover how successful different strategies have been in the past. In effect, descriptive analytics models and tools may be used to answer questions of the form "What happened in the past?" or "What is the best way to quantify and understand what happened in the past"? In contrast, predictive analytics 272, which is typically more difficult to perform than descriptive analytics and provided more benefits to the organization (e.g., in avoiding actions which may not be helpful), attempts to answer questions such as "What is likely to happen if a content presentation action A is taken?" Tools for predictive analytics may include supervised machine learning models, propensity models and the like. Prescriptive analytics 274, which is the most complex and most beneficial of the three approaches, involves answering more complex questions of the form "What combinations of actions are most likely to achieve objectives?", based for example on measurements obtained from optimization iterations of the kind introduced above. Models used for descriptive analytics and predictive analytics tasks may be referred to as observational models, while models used for prescriptive analytics may be referred to as interventional models, as they involve active intervening in the system being modeled (by, for example, presenting content associated with the objective to a subset of a user population). Example approaches used for prescriptive analytics include multi-arm bandit algorithms, contextual bandit algorithms, reinforcement learning algorithms, and the like. In various embodiments, a combination of analytics tools involving descriptive analytics, predictive analytics and prescriptive analytics may be employed at an analytics service similar to analytics service 102 of FIG. 1.

Example High-Level Optimization Workflow

Figure 3:
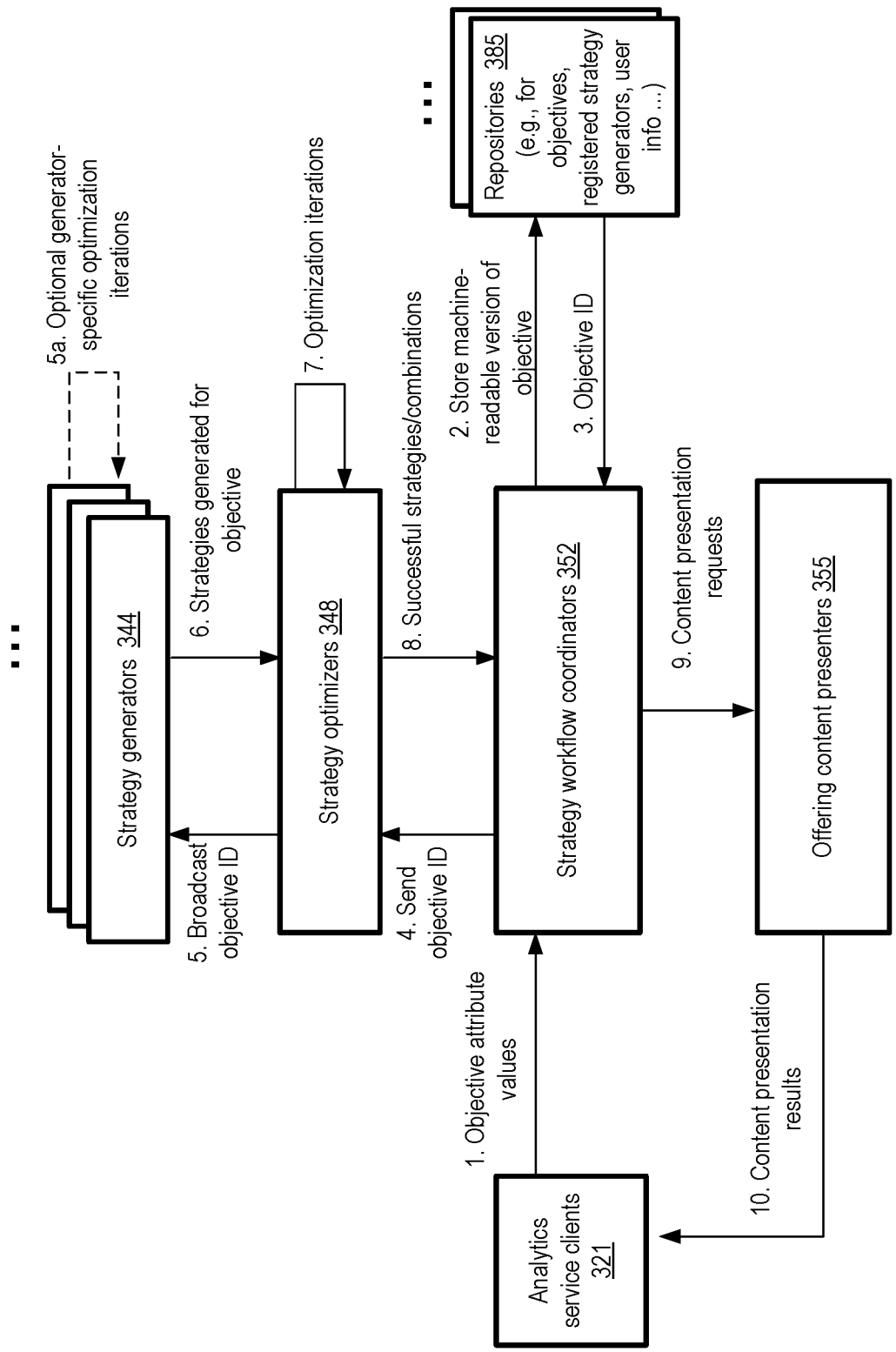
FIG. 3 illustrates an example high-level workflow for identifying or combining strategies to be used to present content to a user population, according to at least some embodiments.

FIG. 3 illustrates an example high-level workflow for identifying or combining strategies to be used to present content to a user population, according to at least some embodiments. Analytics service clients 321 may provide values of various attributes of an objective pertaining to a set of offerings to strategy workflow coordinators 352 in the depicted embodiment as indicated by the arrow labeled 1, e.g., using programmatic interfaces of the analytics service. In some embodiments, front-end request handlers of the analytics service, similar to interface managers 155, may obtain the objective attribute values from the clients and transfer them to the strategy workflow coordinators 352.

A machine-readable version of the objective may be stored at a repository 385 of the analytics service in the depicted embodiment, as indicated by the arrow labeled 2. A unique objective identifier (ID) may be generated for the objective, and provided to the strategy workflow coordinator 352. Repositories 385 may be accessible to strategy optimizers 348 and to strategy generators 344, so that, for example, a machine readable version of the objective can be retrieved from the repository using its ID. The repositories 385 may also store information about registered strategy generators 344, knowledge base entries which can be used to select a set of initial candidate strategies, and so on in the depicted embodiment.

After the objective has been stored in the repository 385, a strategy workflow coordinator may send the objective ID to a strategy optimizer 348, as indicated by the arrow labeled 4. The strategy optimizer may broadcast the objective ID to some number of strategy generators 344 as indicated by the arrow labeled 5; in effect, the strategy optimizer 348 may inform or notify a set of strategy generators that a new objective has been received at the analytics service, and that the strategy optimizer is willing to accept proposed strategies for achieving the objective from any or all of the notified strategy generators 344.

Individual strategy generators 344 may use a variety of approaches for generating user selection strategies for the objective in the depicted embodiment. Some may rely on heuristics, others may use relatively simple machine learning models, while yet others may use complex deep neural network-based models. Information about a user population to which content associated with the offering set may be obtained from a repository 385 in some embodiments, and the state of individual users may be converted to a vector format to be consumed as input by a machine learning model of a strategy generator in some embodiments.

The strategy optimizer 348 may collect strategies produced by the strategy generators 344 for some time period after the notification regarding the objective has been provided, as indicated by the arrow labeled 6. The strategy optimizer 348 may then select an initial subset of the strategies as candidates, e.g., based on analysis of records pertaining to earlier optimization efforts, and initiate a set of optimization iterations as indicated by the arrow labeled 7. In a given iteration, aggregated probabilities for selecting a given user of a sub-sample of the user population may be generated using weights assigned to the candidate strategies, and content may be presented to sub-sample members based on the aggregated probabilities (e.g., with the help of offering content presenters 355). Feedback (e.g., including values of metrics indicated in the objective attributes, as well as more global metrics) to the presentation of the content may be collected, and weights of the different strategies may be adjusted based on analysis of the feedback. Eventually, a single most-successful strategy or a combination of several successful strategies may be identified based on the feedback, and the successful strategies or combinations may be transmitted to the strategy workflow coordinators 352 as indicated by the arrow labeled 8. In one embodiment, one or more of the strategy generators 344 may optionally conduct their own generator-specific optimization iterations, as indicated by the arrow labeled 5a, e.g., to identify an improved set of parameters for their respective strategies before providing the strategies to the strategy optimizer 348.

In at least some embodiments, the strategy workflow coordinators 352 may then send content presentation requests to a set of offering content presenters 355, enabling the successful strategies to be deployed on a larger population of users than were targeted during the optimization iterations. The larger group of users may be provided the content associated with the offering set, and ongoing results of the presentation (e.g., similar feedback metrics as were obtained during the optimization iterations) of the content may be provided to the analytics service clients 321 in the depicted embodiment. In some embodiments, variations of the workflow shown in FIG. 3 may be employed—e.g., objective identifiers or IDs may be provided to analytics service clients, and the clients may initiate the process of optimization according to their own schedules by sending an optimization request to the analytics service. In at least one embodiment, strategy workflow coordinators 352 may not be used.

Example Elements of Offering Set Objectives and Strategies

Figure 4:
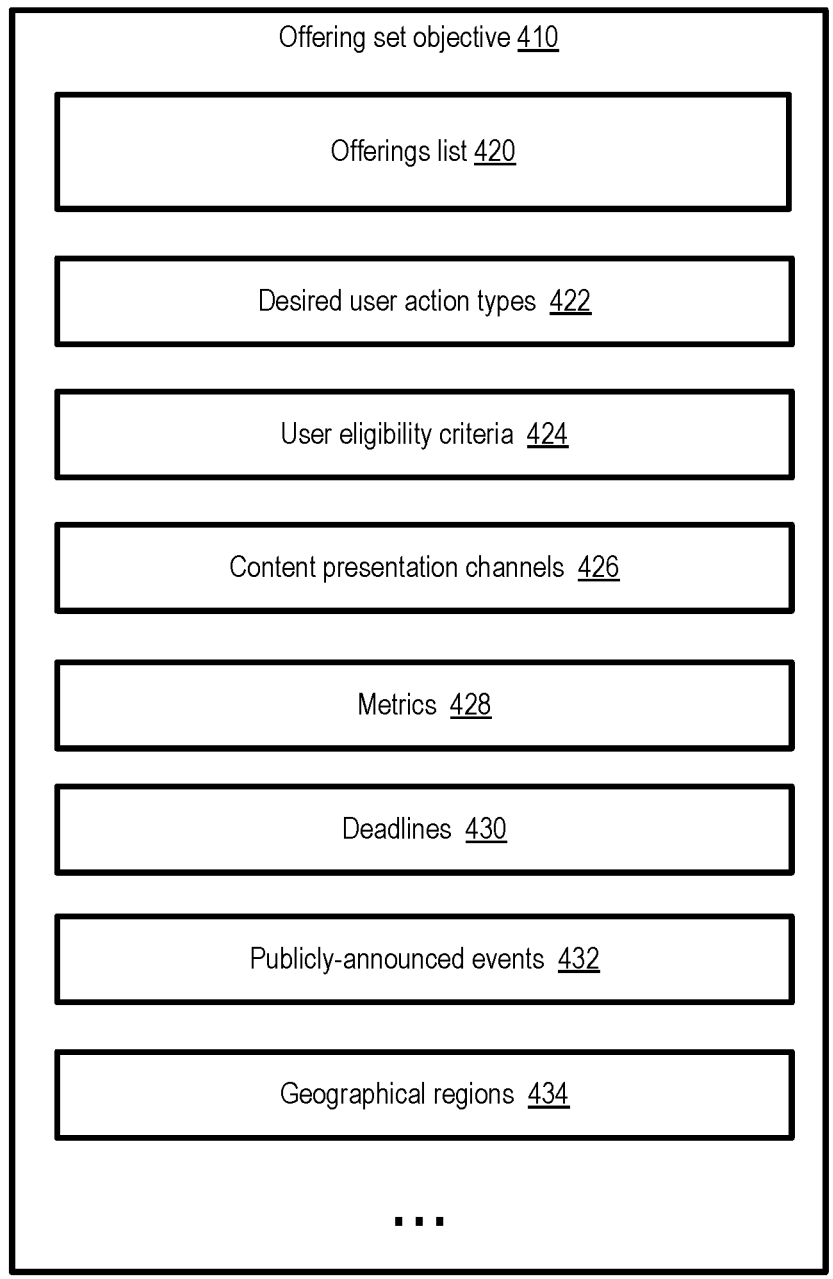
FIG. 4 illustrates example elements of an offering set objective which may be provided to an analytics service, according to at least some embodiments.

FIG. 4 illustrates example elements of an offering set objective which may be provided to an analytics service, according to at least some embodiments. Offering set objective 410 may include an offerings list 420 (e.g., a set of one or more items accessible from a particular portion of a store web site) for which the objective is defined, as well as desired user action types 422 pertaining to the offerings list 420. Examples of user action types may include, among others, clicks on one or more web page links, electronic purchases or rentals of one or more items available via a store catalog, joining a user group, changing a state of a user-specific item list associated with a store catalog, and so on.

In some embodiments, a client of an analytics service may indicate one or more user eligibility criteria 424, which may be utilized to determine a sub-population of users (from a larger population) to which content associated with the offering set can be presented. Note that applying the eligibility criteria may result in the identification of a very large number of users, and that a smaller sub-sample of users may be selected from the eligible users for the optimization iterations in at least some embodiments. For example, an eligibility criterion similar to the following may be specified: "all users who have placed an item of item set S in a wish list of a web site in the last T days but have not completed the purchase of that item", which could match millions of users.

A set of one or more content presentation channels 426 may be specified as part of the objective in some embodiments. Examples of such channels may include e-mail, push notifications, voice-driven personal assistant devices, televisions, radio, newspapers, and the like. One or more feedback metrics 428 to be collected based on the actions (or lack of actions) of users in response to the presentation of content associated with the offering set, and/or from users to whom the content is not presented, may be indicated in the objective 410 in various embodiments. Examples of such metrics may include detected counts/rates of user actions of the desired types, as well as estimated long-term benefits of actions of the desired types. The estimated long-term benefits may be obtained, for example, using one or more machine learning models. The estimation of long-term benefits may take into account the potential side effects of increasing the rates of some user actions—for example, could increasing the rate of beneficial action type A1 associated with the objective 410 actually cause the rate of a different action type A2 (which is not indicated in the objective 410 but is nevertheless a beneficial action from the perspective of other objectives of the organization) to fall, thereby resulting in a net negative impact to the organization?

In some embodiments, a given objective may have a deadline 430 (e.g., a major holiday) or a publicly-announced event 432 (e.g., a special sale period) associated with it; that is, the desired user actions are intended to be performed by the deadline or in conjunction with the publicly-announced event. In one embodiment, a given objective of a large global or national organizational may be directed to one or more geographical regions 434. In some embodiments, objectives may comprise combinations of elements other than those shown in FIG. 4.

Figure 5:
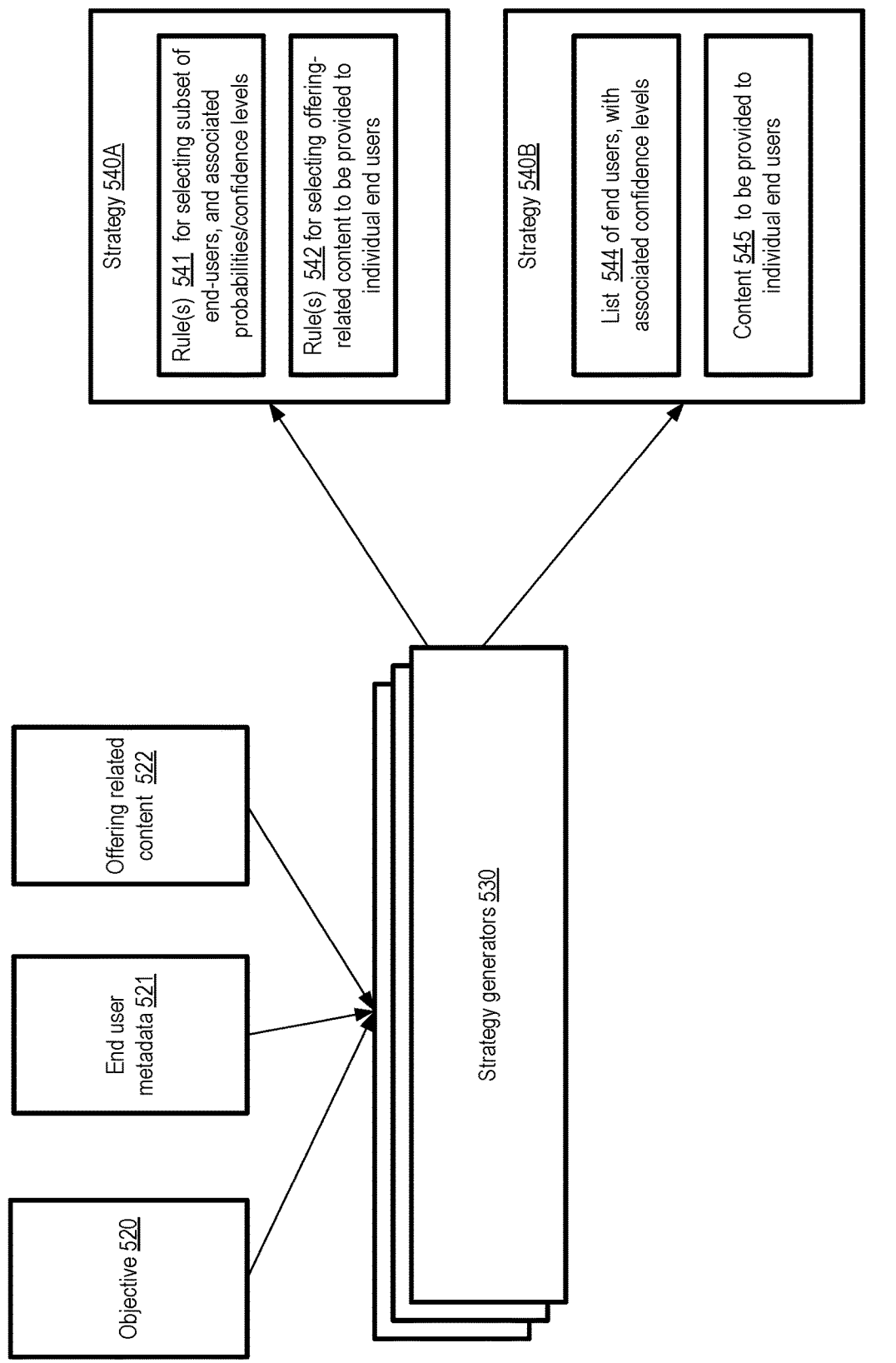
FIG. 5 illustrates example elements of content presentation strategies, according to at least some embodiments.

FIG. 5 illustrates example elements of content presentation strategies, according to at least some embodiments. One or more strategy generators 530 may obtain an indication of an objective 520 with respect to an offering set, end user metadata 521 pertaining to the population of users to whom the offering set may be made available, and offering related content 522 in the depicted embodiment.

Individual strategy generators 530 may prepare strategies of different levels of sophistication or complexity in different embodiments. Some strategies such as 540A may comprise one or more rules 541 (e.g., based partly on user properties or state information expressed as context vectors) for selecting a subset of end users for presenting content, and probabilities or confidence levels associated with the selections of the individual users, Strategy 540A may also include one or more rules 542 for selecting the specific offering-related content to be provided to individual end users; rules 542 may also be probabilistic in some embodiments. Other strategies such as strategy 540B may be simpler— e.g., instead of providing rules for selecting end users, they may simply provide lists 544 of end users with associated confidence levels or probabilities, and/or content 545 to be provided to the individual end users.

Methods for Optimizing Presentation of Offering-Related Content

Figure 6:
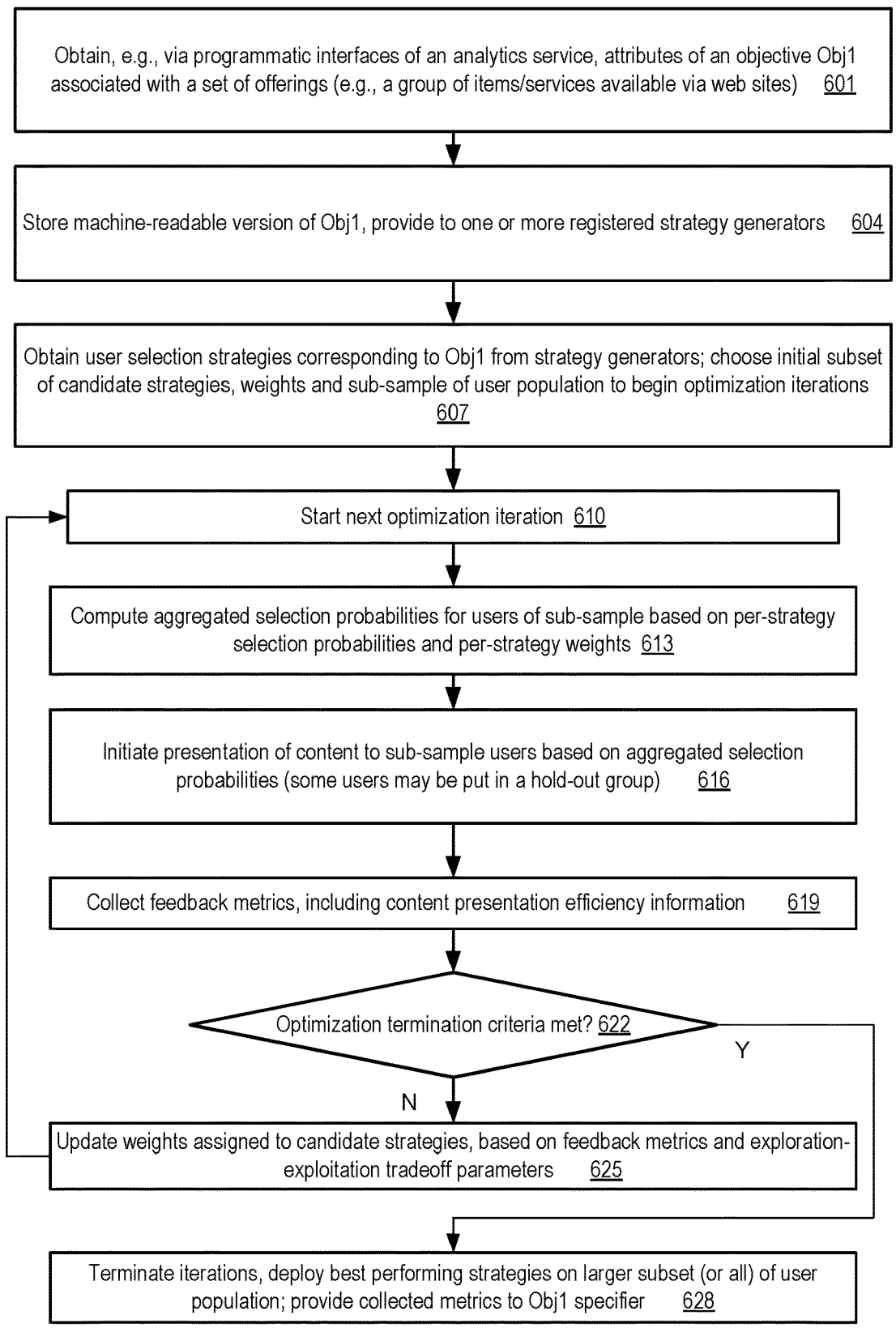
FIG. 6 is a flow diagram illustrating aspects of operations that may be performed to optimize presentation of content associated with offering set objectives, according to at least some embodiments.

FIG. 6 is a flow diagram illustrating aspects of operations that may be performed to optimize presentation of content associated with offering set objectives, according to at least some embodiments. As shown in element 601, attributes of an objective Obj1 associated with a set of offerings (e.g., a group of one or more related items/services available via web sites) of an organization may be obtained, e.g., via programmatic interfaces of an analytics service similar in features and functionality to analytics service 102 of FIG. 1. Obj1 may include, for example, values of some or all of the attributes shown in FIG. 4. In at least one embodiment, the analytics service may implement a graphical user interface which can be used to populate the values of objective attributes, e.g., using drop-down menus and pre-selected default values for some attributes, thereby reducing the effort required from clients of the service to provide objective information in a standard schema. In some embodiments, the analytics service may publish or advertise the schema or taxonomy used for objectives, e.g., including a set of required attributes and/or optional attributes whose values need to be specified to initiate strategy optimization for the objectives.

A machine-readable version of Obj1 may be generated and stored in a repository of the analytics service, and provided or transmitted to one or more registered strategy generators in various embodiments (element 604). Such a notification or transmission of the machine-readable representation may trigger a process of creating user selection strategies at the strategy generators. A given strategy generator may use any of a variety of techniques to generate strategies—e.g., complex neural network-based machine learning models may be used, relatively straightforward heuristics may be used, and so on.

A plurality of user selection strategies corresponding to Obj1 may be obtained, e.g., at an automated strategy optimizer of the analytics service in the depicted embodiment from the strategy generators (element 607). A strategy generator may provide one or more strategies. A given strategy may assign respective selection probabilities to individual users or groups of users from a user population in various embodiments. If the strategy is implemented, users selected according to the probabilities assigned by the strategy may receive at least some content associated with the offering set for which Obj1 was created. In various embodiments, an initial subset of the received strategies may be selected as candidate strategies for iterative optimization. Respective non-negative weights may be assigned to individual candidate strategies, and a sub-sample of the user population may be chosen for conducting at least the initial optimization iterations in various embodiments. In some embodiments, the sub-sample may be selected using random selection.

A number of optimization iterations may be conducted in the depicted embodiment, until a termination criterion is satisfied. A variety of termination conditions may be used in different embodiments, e.g., based on input received from the analytics service client on whose behalf the candidate strategies are being analyzed. For example, in some cases the iterations may be conducted until a specified time period expires or until a specified amount of resources have been consumed for the iterations. In other cases, the optimization iterations may be terminated if the positive or affirmative feedback obtained from a given iteration exceeds a specified target, or if the rate at which measured feedback changes from one iteration to the next falls below a specified limit.

During a given iteration started in operations corresponding to element 610, aggregated selection probabilities for users of the sub-sample may be computed based on per-strategy selection probabilities and per-strategy weights (element 613). Presentation of content to the sub-sample users may be initiated based on aggregated selection probabilities in various embodiments; some users may be put in a hold-out group (i.e., a group to which content associated with the offering set of Obj1 is not provided) (element 616).

Feedback metrics may be collected with respect to the presented content (or, in the case of the hold-out group, without presenting the content) (element 619) for some time period in the depicted embodiment. Some of the feedback metrics collected may be local, in that they may be associated specifically with the offering set of Obj1 in various embodiments; other feedback metrics may be global, in that they may be associated with the entire set of offerings of the organization. For example, if the offering set of Obj1 comprises a group of tennis shoes available from a web site W1, and the web site also offers other types of shoes, some local feedback metrics may indicate a change in a rate at which tennis shoes were purchased over a time period T, while a global feedback metric may indicate a change in a rate at which all shoes of W1 were purchased during the time interval T. In at least some embodiments, feedback metrics may include measures of efficiency of content presentation—e.g., how much network bandwidth and/or how many CPU cycles were consumed in preparing and presenting the content.

After the feedback metrics for a particular iteration are collected, a determination may be made as to whether the optimization termination criteria have been met in the depicted embodiment (element 622). If the criteria have not been satisfied, at least some of the weights assigned to the candidate strategies may be modified in various embodiments (element 625), e.g., based on an analysis of the feedback metrics and/or on an exploration-exploitation tradeoff parameter. The tradeoff parameter may introduce an element of variability to the weight assignment, such that it becomes less likely that the optimization procedure ends up remaining stuck in a local optimum region within the overall optimization space in such embodiments. The next iteration may be initiated after adjusting the weights, and operations corresponding to elements 610 onwards may be performed for the next iteration.

If the termination criteria are satisfied, as also detected in operations corresponding to element 622, further iterations may not be conducted. After the iterations are terminated, one or more of the best-performing strategies (as determined from the feedback metrics) may be deployed on a larger group of users of the user population in at least some embodiments (element 628). One or more feedback metrics collected from the larger group of users may be provided to the client who specified Obj1 in some embodiments.

It is noted that in various embodiments, some of the operations shown in the flow diagram of FIG. 6 may be implemented in a different order than that shown in the figure, or may be performed in parallel rather than sequentially. Additionally, some of the operations shown in FIG. 6 may not be required in one or more implementations.

Example Programmatic Interactions

FIG. 7 illustrates an example graphical user interface which may be used to specify content presentation objectives, according to at least some embodiments. In the depicted embodiment, web-based interface 702 may include an introductory message region 777, followed by a plurality of elements for respective attributes of an objective. In the introductory message region 777, a client of an analytics service may be informed that while a set of drop-down menu options are available, the client may instead provide custom entries for various attribute fields if desired. The message region 777 may also indicate that a machine-readable version of the objective will be provided to strategy generators, and the most effective strategies will be implemented.

Interface element 703 may be used to specify a user-friendly name for the objective in the depicted embodiment, such as "MyObjective Q4 2020" 704. Interface element 705 may be used to indicate the set of offerings for which the objective is to be achieved. A drop-down menu icon 778 may be used to select from a set of pre-populated options in the depicted embodiment, such as website catalog items group IG1 707. The "Required" label 708 associated with offering set element 705 may inform the client that a value for the offering set is required in order to generate the machine-readable version of the objective and to initiate the automated optimization procedure.

Interface element 712 pertains to desired user actions, for which a drop down menu is also provided to enable clients to select from commonly-specified types of user actions such as "Click on link to item" 714. Interface element 718 may be used to indicate eligibility criteria for users; a default setting "All users are eligible" 720 is shown, indicating that all the users of the user population of the organization for which the objective is being specified are assumed to be eligible unless the client indicates otherwise. The "Optional" label 722 indicates that a client is not required to provide user eligibility criteria.

Interface element 724 enables clients to specify deadlines or events associated with the objective; by default, the deadline "1 month from today" 726 is used. Interface element 730 allows users to specify content channels for the objective, such as emails, push notifications 732 and the like. Feedback metrics, such as clicks/second 738 for the objective may be specified using element 736. Optimization termination criteria 742, such as deadline expiration 744, may also be specified if desired by the client using web-based interface 702. The specification of the termination criteria and the deadline/event information may be optional in the depicted embodiment, as indicated by "Optional" labels 746 and 728. The specification of content channels 730 and feedback metrics 736 may be required, as indicated by the "Required" labels 734 and 740. Default values for some attributes of the objective may be chosen in some cases based on analysis of values supplied by the client for other attributes of the objective in some embodiments—e.g., as soon as the client specified an offering set of a particular type via interface element 707, a default desired user action (based on the type of offering set) may be provided for interface element 714.

By using the "Save" interface element, a client of an analytics service may cause the provided information about the objective to be stored at a repository in the depicted embodiment. If the client wishes to view information about the strategy generators (e.g., the entities that have been registered as strategy generators, the types of machine learning algorithms or heuristics being used by the different strategy generators, etc.), the element "View strategy generator info" 768 may be used. To initiate an iterative optimization procedure of the kind described above, the "InitiateOptimization" element 769 may be used.

Figure 8:
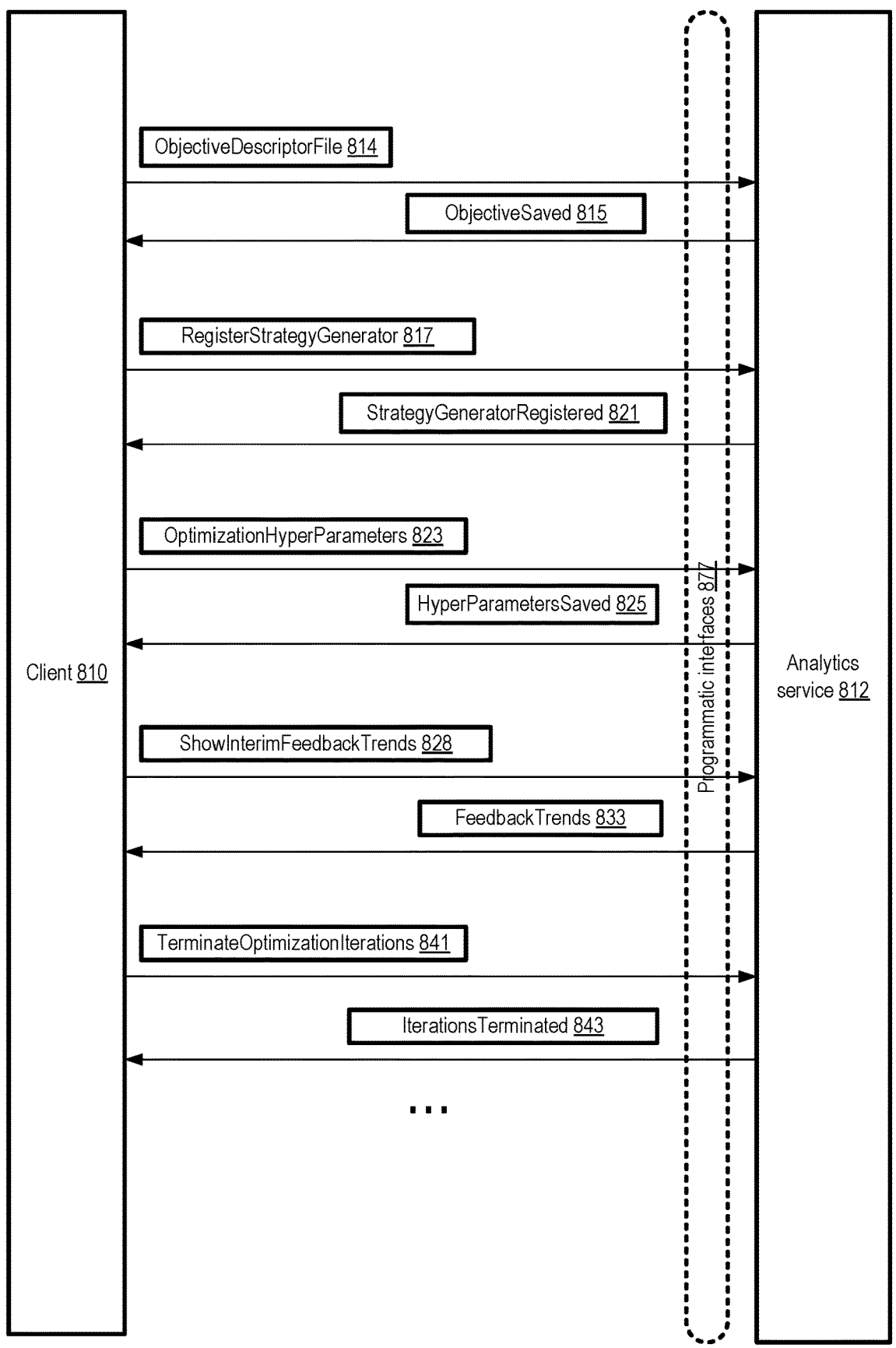
FIG. 8 illustrates example programmatic interactions pertaining to optimization of strategies for content presentation, according to at least some embodiments.

Other types of programmatic interactions may also be supported by an analytics service in some embodiments. FIG. 8 illustrates example programmatic interactions pertaining to optimization of strategies for content presentation, according to at least some embodiments. Programmatic interfaces 877 implemented by analytics service 812, similar in features and functionality to analytics service 102 of FIG. 1, may include a set of application programming interfaces (APIs), command-line tools, graphical user interfaces and/or web-based tools similar to interface 702 of FIG. 7 in the depicted embodiment.

If a client 810 wishes to submit a programmatic descriptor of an objective in a markup language such as XML (Extended Markup Language), YAML (Yet Another Markup Language) or JSON (JavaScript Object Notation), instead of using a web-based interface 702, an ObjectiveDescriptorFile 814 may be submitted via programmatic interfaces 877. The contents of the descriptor may be parsed for correctness, converted into a different internal machine-readable format if needed and stored at a repository of the analytics service 812 in the depicted embodiment. An ObjectiveSaved message 815 may be sent to the client in at least one embodiment. In some embodiments, submitting an objective to the analytics service may represent an implicit request to initiate strategy optimization iterations with respect to the objective.

Clients of the analytics service may submit registration requests indicating strategy generators in at least some embodiments. A RegisterStrategyGenerator request 817 may, for example, provide identification information about an entity (e.g., the submitter of the request, or some other entity proposed as a strategy source), network addresses to which notifications of newly-defined objectives for which strategies are needed are to be sent, and so on. In response, the provided identification and networking metadata of the strategy generator may be stored in a repository of the analytics service, and a StrategyGeneratorRegistered message 821 may be sent to the client 810 in the depicted embodiment.

In at least one embodiment, a client 810 may provide preferred values of one or more hyper-parameters of the optimization procedure to be used on the client's behalf, e.g., by submitting one or more OptimizationHyperParameters messages 823 via the interfaces 877. Such messages may be used, for example, to indicate (a) the exploration-exploitation tradeoff parameter used in the optimization iterations, (b) a sampling parameter to be used to select the sub-sample of the user population used for at least some optimization iterations, (c) the termination criterion for the optimization iterations, or (d) a time period during which the feedback metrics are to be collected in a given optimization iteration. In some embodiments, the hyper-parameters may indicate one or more criteria for selecting the candidate strategies for the optimization iterations from among the group of strategies proposed by the strategy generators. The hyper-parameters may be stored at the analytics service, and a HyperParametersSaved message 825 may be sent to the client 810.

A client 810 may view intermediate trends in the feedback collected while the optimization iterations are underway in the depicted embodiment, e.g., by submitting a ShowInterimFeedbackTrends request 828. Changes in the values of the collected feedback metrics from one iteration to another may be presented via one or more FeedbackTrends messages 833.

Based on viewing the trends or for other reasons, a client 810 may wish to terminate the optimization iterations being conducted on the client's behalf in some embodiments. A TerminateOptimizationiterations request 841 may be sent to the analytic service in such a scenario. The optimization process may be terminated, and an IterationsTerminated message 843 may be sent to the client in at least some embodiments.

In some embodiments, a different combination of programmatic interactions pertaining to optimizations of content presentation strategies may be supported than those shown in FIG. 7 and FIG. 8.

Example Provider Network Environment

Figure 9:
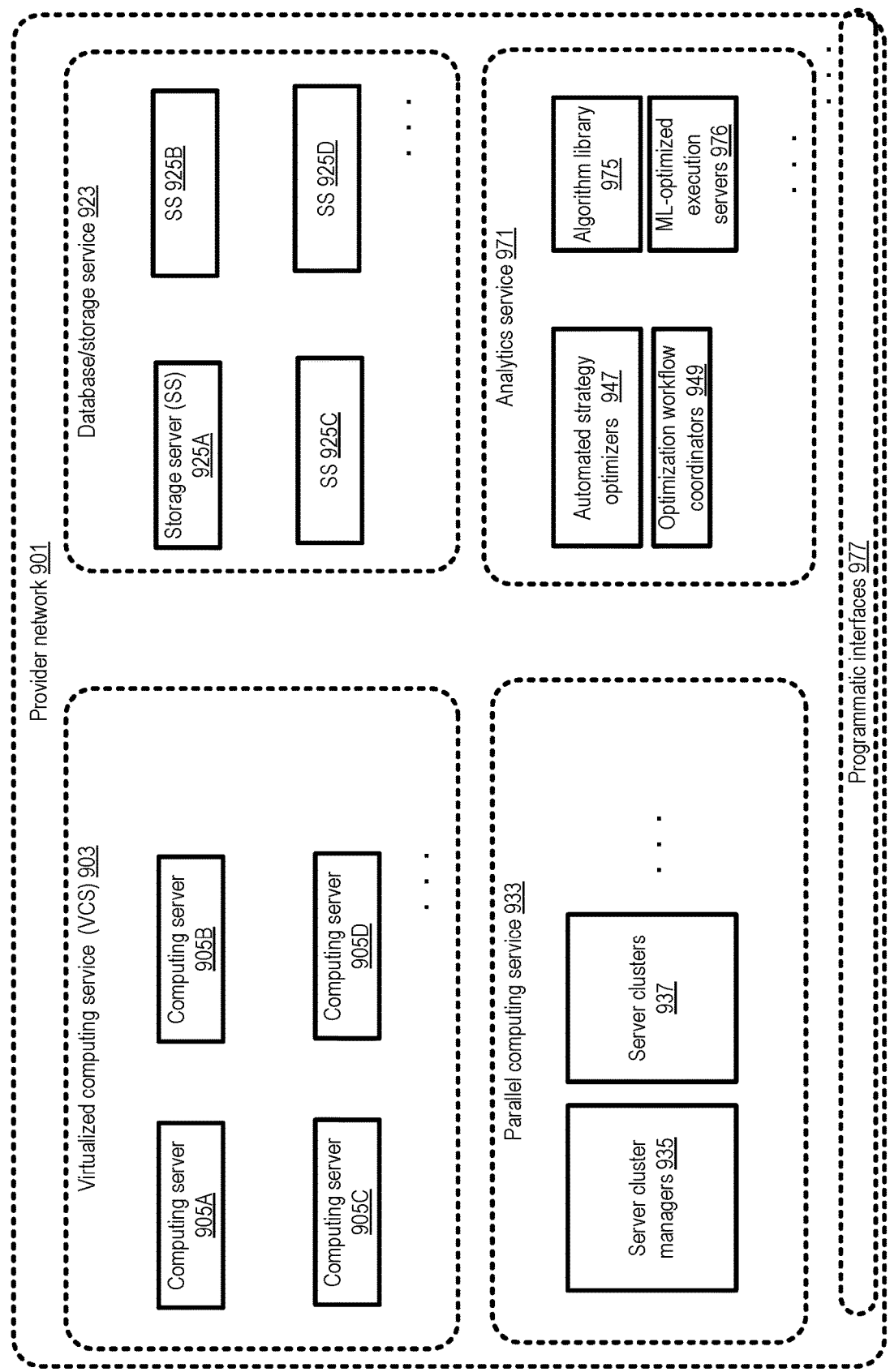
FIG. 9 illustrates an example provider network environment in which an analytics service may be used to optimize content presentation strategies, according to at least some embodiments.

In some embodiments, as mentioned earlier, an analytics service at which strategy optimization techniques similar to those described above are executed may be implemented at a provider network. FIG. 9 illustrates an example provider network environment in which an analytics service may be used to optimize content presentation strategies, according to at least some embodiments. In the depicted embodiment, provider network 901 may comprise resources used to implement a plurality of services, including for example a virtualized computing service (VCS) 903, a database/storage service 923, and a parallel computing service 933 as well as an analytics service 971 within which at least some phases of an iterative technique for optimizing content presentation strategies may be implemented. The analytics service 971, which may also be referred to as a machine learning service or an artificial intelligence service, in turn may comprise algorithm library 975, one or more automated strategy optimizers 947, optimization workflow coordinators 949, and machine learning-optimized execution servers 976 in the depicted embodiment. The parallel computing service 933 may comprise various server clusters 937, each comprising a plurality of servers, on which parallelizable workloads may be distributed by a set of server cluster managers 935 in the depicted embodiment. Some of the algorithms implemented at the analytics service 971 may be parallelizable, and may utilize the server clusters 937 in at least some embodiments. For example, optimization iterations for several different objectives (of different clients or the same client of the analytics service) may be run in parallel using respective server clusters in one embodiment.

Components of a given service may utilize components of other services in the depicted embodiment—e.g., for some analytics service tasks, virtual machines implemented at computing servers such as 905A-905D of the virtualized computing service 903 may be used, server clusters 937 and/or cluster managers 935 may be utilized for parallelizable computations of the analytics service as mentioned above, data sets (e.g., offering metadata, user metadata etc.) and/or output produced at the analytics service may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

In some embodiments, at least some aspects of the optimization techniques described herein may be implemented without acquiring resources of network-accessible services such as those shown in FIG. 9. For example, a standalone tool implemented at one or more computing devices which are not part of a network-accessible service may be used in one embodiment.

Use Cases

The techniques described above, of iteratively identifying the best combinations of proposed strategies for selecting users to whom content associated with offerings of an organization is presented may be extremely beneficial in a variety of scenarios. For example, such techniques may be used to ensure that content which is most likely to result in desired actions from users of web sites, without presenting content unlikely to be of interest to the users, is provided to the users while minimizing resource usage.

Illustrative Computer System

Figure 10:
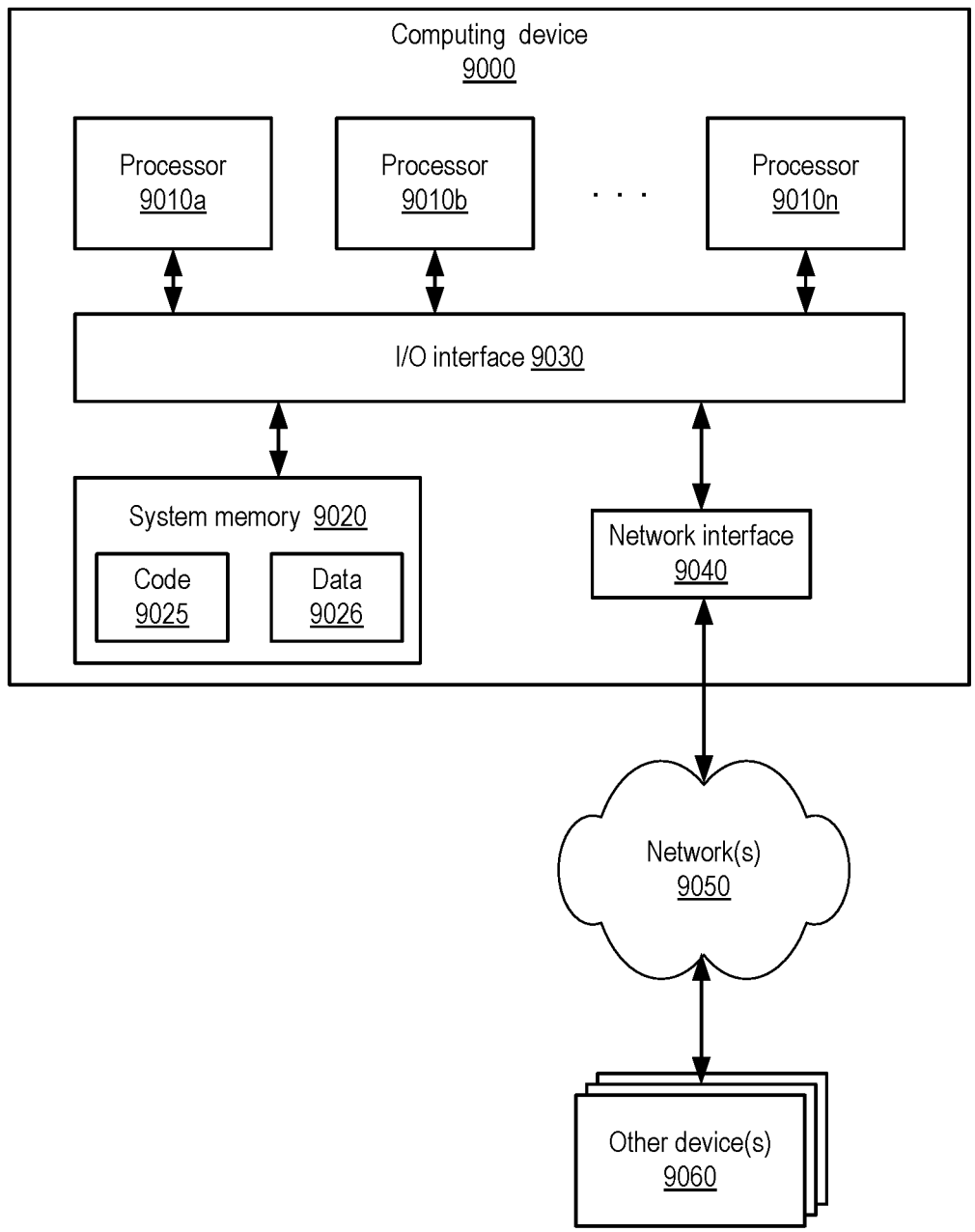
FIG. 10 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising respective processors and memory that implement a machine learning system, wherein the one or more computing devices include instructions that upon execution on or across the one or more computing devices cause the machine learning system to:
obtain, via one or more programmatic interfaces, values of a plurality of attributes of a first objective associated with a first offering set comprising one or more network-accessible offerings of an organization, wherein the values indicate at least (a) one or more types of desired user actions with respect to one or more web sites of the organization, (b) one or more channels for presentation of content associated with the first objective, and (c) one or more offering set-specific metrics associated the one or more types of desired user actions;
provide a machine-readable representation of the first objective to one or more registered strategy generators;
obtain, from the one or more registered strategy generators, a plurality of user selection strategies for the first objective, including at least one user selection strategy generated using a machine learning algorithm to which the machine-readable representation is provided as input, wherein a user selection strategy of the plurality of user selection strategies assigns respective selection probabilities of receiving at least some content associated with the first offering set to individual users of a user population;
identify, based at least in part on an analysis of a repository of records of one or more respective objectives associated with one or more previous offering sets, an initial subset of candidate user selection strategies from the plurality of user selection strategies;
provision one or more compute resources to perform a machine learning process with respect to a first sub-sample of the user population;
execute the machine learning process using the one or more compute resources, wherein the execution of the machine learning process includes a plurality of optimization iterations using at least the initial subset of candidate user selection strategies, wherein an individual optimization iteration includes to:
compute respective aggregated selection probabilities for individual users of the first sub-sample based at least in part on (a) per-strategy selection probabilities for the individual users, obtained from individual ones of the candidate user selection strategies and (b) respective weights assigned to the candidate user selection strategies;
send, to one or more content presentation computers over one or more networks, based at least in part on the aggregated selection probabilities, one or more content presentation requests of at least some content associated with the first offering set, wherein the content presentation computers are configured to present content according to the one or more content presentation requests to at least some users of the first sub-sample via a channel of the one or more channels;

receive, from the one or more contention presentation computers and over the one or more networks, one or more feedback metrics associated with presentation of the content over a selected time interval, including (a) at least one offering set-specific metric of the one or more offering set-specific metrics and (b) at least one resource usage metric associated with the presentation of the content; and update at least some weights of the respective weights, based at least in part on (a) analysis of the one or more feedback metrics and (b) an exploration-exploitation tradeoff parameter that controls the machine learning process;

terminate the machine learning process when an optimization termination criterion of the machine learning process is met, wherein the termination criterion is based at least in part on a specified amount of compute resources consumed by the machine learning process;

cause, in accordance with a set of weights updated by the machine learning process, at least some content associated with the first offering set to be presented to at least some users of the user population which were not in the first sub-sample; and add one or more records of the first objective to the repository of records, wherein the one or more records are used to select candidate user selection strategies for later offering sets and reduce time and resources used to optimize presentation of the later offering sets.

2. The system as recited in claim 1, wherein the individual optimization iteration comprises:

collecting one or more hold-out metrics from a hold-out group of users to which content associated with the first offering set is not provided, wherein the updating of the at least some weights is based at least in part on analysis of the one or more hold-out metrics.

3. The system as recited in claim 1, wherein the machine learning system is implemented as part of an analytics service, wherein the analytic services is implemented using compute and storage resources provided by a network-accessible resource provider network, and wherein the compute resources include one or more machine learning-optimized execution servers and one or more optimization workflow coordinators.

4. The system as recited in claim 1, wherein the one or more computing devices include further instructions that upon execution on or across the one or more computing devices further cause the machine learning system to:

obtain, via a programmatic interface of a network-accessible service of a provider network, a request for optimization of user-selection strategies, wherein the plurality of optimization iterations is executed in response to the request and using computing resources provisioned by the provider network in response to the request.

5. The system as recited in claim 1, wherein to identify the initial subset of candidate user selection strategies, the one or more computing devices include further instructions that upon execution on or across the one or more computing devices further cause the machine learning system to:

generate a first embedding vector representing the first objective; and determine a score indicative of a similarity between the first embedding vector and a second embedding vector representing a second objective for which a record is stored in the repository.

6. A computer-implemented method, comprising:

performing, by a machine learning system implemented using one or more computing devices comprising respective processors and memory:

determining respective values of a plurality of attributes of a first objective associated with a first offering set comprising one or more network-accessible offerings, wherein the respective values indicate at least (a) one or more types of desired user actions and (b) one or more offering set-specific metrics associated with the one or more types of desired user actions;

obtaining, from one or more strategy providers, a plurality of user selection strategies for the first objective, wherein a user selection strategy of the plurality of user selection strategies assigns respective selection probabilities of receiving at least some content associated with the first offering set to individual users of a user population;

provisioning one or more compute resources to perform a machine learning process with respect to a first sub-sample of the user population;

executing the machine learning process using the one or more compute resources, wherein the execution of the machine learning process includes a plurality of optimization iterations using at least a first subset of user selection strategies of the plurality of user selection strategies, wherein an individual optimization iteration comprises at least:

computing respective aggregated selection probabilities for individual users of the first sub-sample based at least in part on (a) per-strategy selection probabilities for the individual users, obtained from individual ones of the first subset of user selection strategies and (b) respective weights assigned to individual ones of the first subset of user selection strategies;

sending, to one or more content presentation computers over one or more networks, based at least in art on the aggregated selection probabilities, one or more content presentation requests of at least some content associated with the first offering set, wherein the content presentation computers are configured to present content according to the one or more content presentation requests to at least some users of the first sub-sample;

receiving, from the one or more contention presentation computers and over the one or more networks, one or more feedback metrics associated with presentation of the content over a selected time interval, including (a) at least one offering set-specific metric of the one or more offering set-specific metrics and (b) at least one resource usage metric associated with the presentation of the content; and updating at least some weights of the respective weights, based at least in part on (a) analysis of the one or more feedback metrics and (b) an exploration-exploitation tradeoff parameter that controls the machine learning process;

terminating the machine learning process when an optimization termination criterion of the machine learning process is met, wherein the termination criterion is based at least in part on a specified amount of compute resources consumed by the machine learning process;

causing, in accordance with a set of weights updated by the machine learning process, at least some content associated with the first offering set to be presented to at least some users of the user population which were not in the first sub-sample; and adding one or more records of the first objective to a repository of records, wherein the one or more records are used to select user selection strategies for later offering sets and reduce time and resources used to optimize presentation of the later offering sets.

7. The computer-implemented method as recited in claim 6, wherein the first offering set includes one or more of: (a) one or more items of a catalog which are available for purchase, (b) membership of a user group, (c) a subscription to a service, or (d) a discount.

8. The computer-implemented method as recited in claim 6, wherein the one or more types of desired user actions include one or more of: (a) clicks on one or more web page links, (b) electronic purchases of one or more items available via a store catalog, (c) joining a user group, (d) changing a state of a user-specific item list associated with a store catalog.

9. The computer-implemented method as recited in claim 6, wherein the respective values of the plurality of attributes indicate one or more of: (a) an eligibility criterion for a user to be identified as a candidates for receiving content associated with the first offering set, (b) a deadline associated with the first objective, (c) a publicly-advertised event associated with the first objective, (d) one or more content channels to be used to provide content associated with the first offering set to users, (e) a geographical region within which users are to be provided content associated with the first offering set, or (f) at least a portion of a web site with respect to which the one or more types of actions are desired.

10. The computer-implemented method as recited in claim 6, wherein the one or more offering set-specific metrics include one or more of: (a) counts of actions of the one or more types of desired user actions, (b) rates of actions of the one or more types of desired user actions, (c) estimated long-term benefits of actions of the one or more types of desired user actions, wherein the estimated long-term benefits are obtained using one or more machine learning models.

11. The computer-implemented method as recited in claim 6, wherein:
the machine learning system implements a graphical user interface; and
at least some values of the plurality of attributes are obtained via one or more elements of the graphical user interface including one or more of: (a) a drop-down menu interface element, and (b) one or more fields in which default attribute values are populated automatically based at least in part on an analysis of values of one or more other fields.

12. The computer-implemented method as recited in claim 6, further comprising:
causing to be provided, via one or more programmatic interfaces, a list of one or more attributes of objectives associated with offering sets for which respective values are required to initiate the plurality of strategy optimization iterations.

13. The computer-implemented method as recited in claim 6, further comprising:
in response to one or more registration requests, storing metadata pertaining to the one or more strategy providers in the repository; and
determining, using the metadata, that a notification pertaining to the first objective is to be provided to the one or more strategy providers.

14. The computer-implemented method as recited in claim 6, further comprising:
obtaining, via one or more programmatic interfaces, an indication of one or more parameters of the plurality of strategy optimization iterations, including one or more of: (a) the exploration-exploitation tradeoff parameter, (b) a sampling parameter to be used to select the first sub-sample of the user population, (c) the optimization termination criterion, or (d) a time period during which the feedback metrics are to be collected in an optimization iteration.

15. The computer-implemented method as recited in claim 6, wherein the one or more feedback metrics include one or more of: (a) an efficiency metric based at least in part on resource usage associated with provision of content associated with the first offering set, or (b) a hold-out metric associated with actions of one or more users to whom content associated with the first offering set is not provided during at least some optimization iterations.

16. One or more non-transitory computer-accessible storage media storing program instructions that when executed on or across one or more processors implement a machine learning system and cause the machine learning system to:
obtain a plurality of strategies for a first objective associated with a first offering set, wherein a strategy of the plurality of strategies assigns respective selection probabilities of receiving at least some content associated with the first offering set to individual users of a user population;
provision one or more compute resources to perform a machine learning process with respect to a first sub-sample of the user population;
execute the machine learning process using the one or more compute resources, wherein the execution of the machine learning process includes a plurality of optimization iterations using at least a first subset of strategies of the plurality of strategies, wherein an individual optimization iteration includes to:
compute respective aggregated selection probabilities for individual users of the first sub-sample based at least in part on (a) per-strategy selection probabilities for the individual users, obtained from individual ones of the first subset of strategies and (b) respective weights assigned to individual ones of the first subset of strategies;
send, to one or more content presentation computers over one or more networks, based at least in art on the aggregated selection probabilities, one or more content presentation requests of at least some content associated with the first offering set, wherein the content presentation computers are configured to present content according to the one or more content presentation requests to at least some users of the first sub-sample;
receive, from the one or more contention presentation computers and over the one or more networks, one or more feedback metrics associated with presentation of the content over a selected time interval, including (a) at least one offering set-specific metric of the one or more offering set-specific metrics and (b) at least one resource usage metric associated with the presentation of the content; and update at least some weights of the respective weights based at least in part on (a) analysis of the one or more feedback metrics and (b) an exploration-exploitation tradeoff parameter that controls the machine learning process;

terminate the machine learning process when an optimization termination criterion of the machine learning process is met, wherein the termination criterion is based at least in part on a specified amount of compute resources consumed by the machine learning process;

cause, in accordance with a set of weights updated by the machine learning process, at least some content associated with the first offering set to be presented to at least some users of the user population which were not in the first sub-sample; and add one or more records of the first objective to a repository of records, wherein the one or more records are used to select user selection strategies for later offering sets and reduce time and resources used to optimize presentation of the later offering sets.

17. The one or more non-transitory computer-accessible storage media as recited in claim 16, storing further program instructions that when executed on or across the one or more processors further cause the machine learning system to:

compute a context vector based at least in part on a representation of a particular user's state with respect to the individual optimization iteration, wherein the particular user's state with respect to the individual optimization iteration differs from the particular user's state with respect to a previous optimization iteration, wherein the context vector is based at least in part on metrics collected prior to initiation of the strategy optimization iterations, and wherein an aggregate selection probability for the particular user is based at least in part on the context vector.

18. The one or more non-transitory computer-accessible storage media as recited in claim 16, storing further program instructions that when executed on or across the one or more processors further cause the machine learning system to:

obtain values of the one or more hyper-parameters of the machine learning process via a programmatic interface.

19. The one or more non-transitory computer-accessible storage media as recited in claim 16, wherein content presented to a particular user of the first sub-sample comprises one or more of: (a) a set of text tokens, (b) an image, (c) a video, or (d) an audio segment.

20. The one or more non-transitory computer-accessible storage media as recited in claim 16, wherein a particular strategy of the plurality of strategies indicates a content item to be presented to one or more users of the user population.

* * * * *